(12) United States Patent
Fabian et al.

(10) Patent No.: US 12,446,681 B2
(45) Date of Patent: Oct. 21, 2025

(54) CHAIR-EZE

(71) Applicants: Janelle Fabian, Spring Grove, IL (US); Justin E Diamond, Chicago, IL (US)

(72) Inventors: Janelle Fabian, Spring Grove, IL (US); Justin E Diamond, Chicago, IL (US)

( * ) Notice: Subject to any disclaimer, the term of this patent is extended or adjusted under 35 U.S.C. 154(b) by 215 days.

(21) Appl. No.: 18/340,069

(22) Filed: Jun. 23, 2023

(65) Prior Publication Data

US 2024/0099444 A1  Mar. 28, 2024

(51) Int. Cl.
*A45F 4/02* (2006.01)
*A47G 9/06* (2006.01)
*A45F 5/00* (2006.01)

(52) U.S. Cl.
CPC ............. *A45F 4/02* (2013.01); *A47G 9/062* (2013.01); *A45F 5/1566* (2025.01)

(58) Field of Classification Search
CPC ........................................... A61G 1/01
USPC .................................. 224/157, 921; 5/625
See application file for complete search history.

(56) References Cited

U.S. PATENT DOCUMENTS

| | | | | |
|---|---|---|---|---|
| 1,795,435 A * | 3/1931 | Melzer | ............. | A61G 1/003 5/625 |
| 3,771,808 A * | 11/1973 | Duerst | ............. | B62B 15/00 280/19 |
| 4,738,545 A * | 4/1988 | Westgor | ............. | A45C 3/10 472/137 |
| 4,856,912 A * | 8/1989 | Damus | ............. | A45F 4/02 33/270 |
| 5,110,219 A * | 5/1992 | Lopes | ............. | A45C 9/00 5/419 |
| 5,863,088 A * | 1/1999 | Kelly, Sr. | ............. | A45F 4/02 294/146 |
| 7,832,743 B2 * | 11/2010 | Small | ............. | A22B 5/06 5/628 |
| 9,428,931 B2 * | 8/2016 | Samaripa | ............. | A45F 4/06 |
| 2007/0295773 A1 * | 12/2007 | Wegenhoft | ............. | A47G 9/062 224/576 |
| 2009/0038076 A1 * | 2/2009 | Giduck | ............. | A61G 1/01 5/627 |

OTHER PUBLICATIONS

Youtube.com/watch?v=nD8L6S-1K21, "Chair-Eze", published Apr. 30, 2021 (four screenshots Chair-Eze 1-4). (Year: 2021).*
Youtube.com/watch?v=ir6nTLoC7Ks, "Buy Wholesale #bagtoblanket Chair-Eze.com", published Feb. 7, 2022 (four screenshots Chair-Eze A-D). (Year: 2022).*

* cited by examiner

*Primary Examiner* — Scott T McNurlen

(57) ABSTRACT

The embodiments herein relate in general to a carrier of oversized and odd shaped items such as outdoor collapsible folding chairs, while also serving as a multi-purpose tool to be used as a mat, shade device, and multipurpose carrier.

6 Claims, 11 Drawing Sheets

CHAIR-EZE

CLAIM

The embodiments herein relate in general to a carrier of oversized and odd shaped items such as outdoor collapsible folding chairs, while also serving as a multi-purpose tool to be used as a mat, shade device, and multipurpose carrier.

BACKGROUND

This invention concerns convenience. Attending an event, sport practice, beach or park visit can require much forethought and frustration with packing and unpacking each umbrella and foldable chair from individual drawstring bags that fit tightly and knot easily.

There is also a need to set up quickly without having to miss out on the event one has prepared to attend.

There is also a need to pack up quickly and easily in one clear step. There are multiple uses for this convenience including sport and recreational activities.

It is convenient to eliminate a picnic blanket or beach mat from the items needed to be packed.

It is convenient to eliminate the need for original chair packaging when arriving and exiting once or multiple events throughout a season or any period of time.

While there exist products and bags for carrying smaller items, there is presently no nonspecific tool or carrying device intended for recreational use that groups items together and eases the accessibility to said items to set up and take-down of each individual chair or item.

Multiple chair carrier and holder that turns into a picnic blanket. The novel concept saves time and frustration compared to the current set up and take down process.

SUMMARY

Disclosed herein is an open-ended bag and are the systems to keep the structure of an open-ended bag to accommodate collapsible chairs, umbrellas, sports equipment, and any long or odd shaped items that are traditionally hard to carry.

One such use in the carry tote position and for easy entrance and exit is to accommodate one or multiple collapsible outdoor folding chairs for parades, concerts, outdoor practices, sports, and activities.

Another such use in the carry tote position and for easy entrance and exit is for elongated sports equipment such as hockey sticks, water skis, snow skis and poles, loose golf clubs, beach umbrellas and elongated beach toys, sports as a volleyball or badminton net set, tent poles and other camping equipment, and other any items that can be awkward to carry.

Another benefit to using the carrying sling bag is to lay it on the ground to use as a clean spot for eating, relaxing, and use as a picnic blanket or beach mat. Multiple chair carrier and holder that turns into a picnic blanket. The novel concept saves time and frustration compared to the current set up and take down process.

A major convenience of use of this product is the ease in which one is able to set up and take down the items in which were carried. A simple drop and grab to access items during set-up. Simply place items back onto the mat, grab the handles, and back into a tote for a quick exit.

Other uses for the tote and mat can be used to seek shade during heavy sun or to keep rain and debris at bay during inclement weather.

Multiple chair carrier and holder that turns into a picnic blanket. The novel concept saves time and frustration compared to the current set up and take down process.

These and other aspects of the present disclosure are disclosed in the following detailed description of the embodiments.

DETAILED DESCRIPTION

In accordance with this invention, it is now possible for a person to carry one or multiple collapsible chairs or one or more items in one location. The set up and take down time and energy is reduced when bringing items to and from an area FIG. 9. The embodiment illustrated in the figures and corresponding description below is for the carrying, ease in access to one's items and comfort in laying out a clean area for one to use when item is not being used as the tote FIG. 10.

In the following descriptions, some specific details are described in order to provide a thorough understanding of various embodiments of the invention. However, the invention may be practiced without these or other specific details. In other instances, well-known structures and methods of making, using, displaying have not necessarily been shown or described in detail to avoid unnecessarily obscuring descriptions of the embodiments of the invention.

Figure 1:
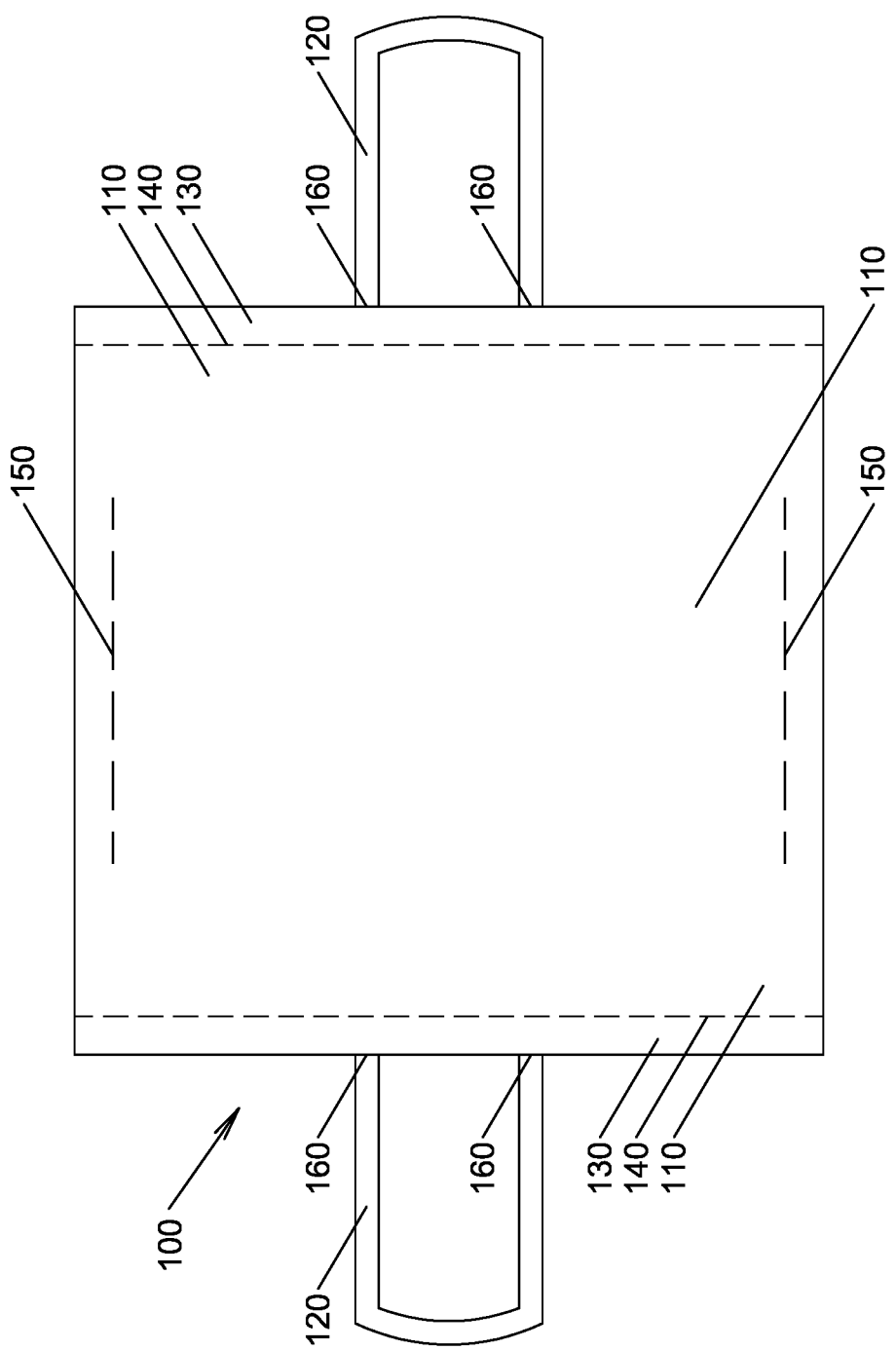
FIG. 1 is a perspective view of an embodiment of a system for use in mat or blanket mode.
Figure 2:
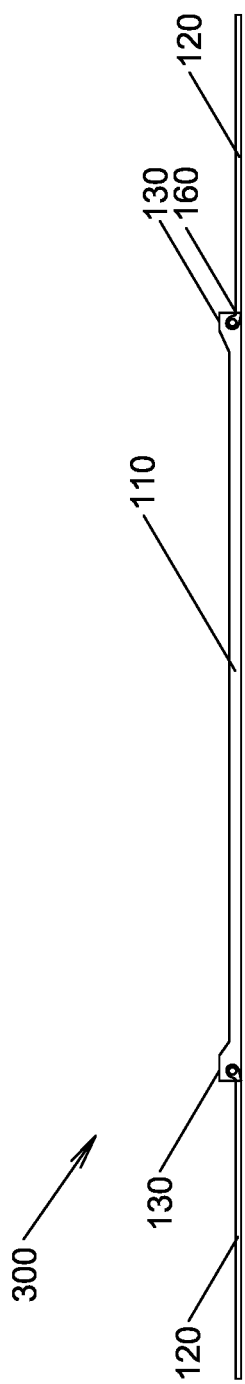
FIG. 2 is a cross section drawing from middle of unit's length
Figure 3:
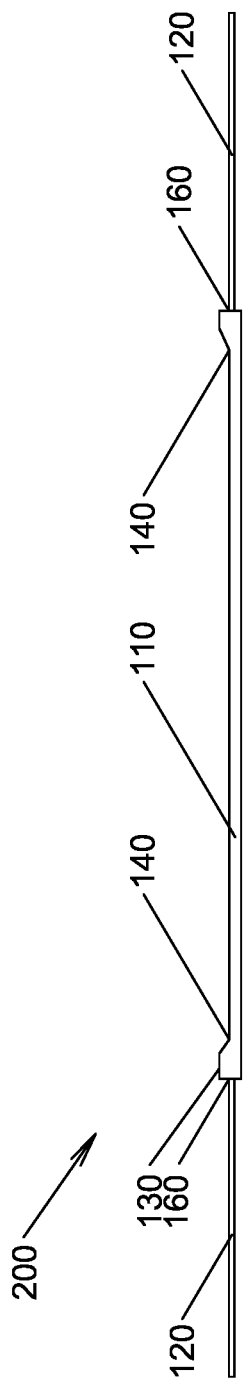
FIG. 3 is side elevation drawing.
Figure 4:
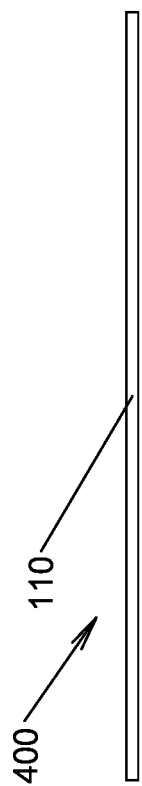
FIG. 4 is section drawing of unit's width.
Figure 5:
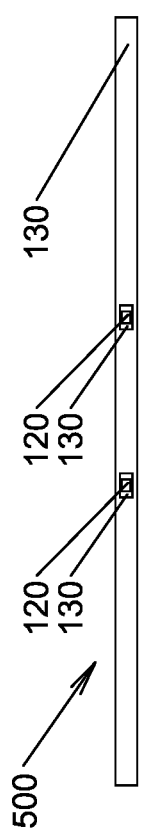
FIG. 5 is elevation drawing of unit's width.
Figure 6:
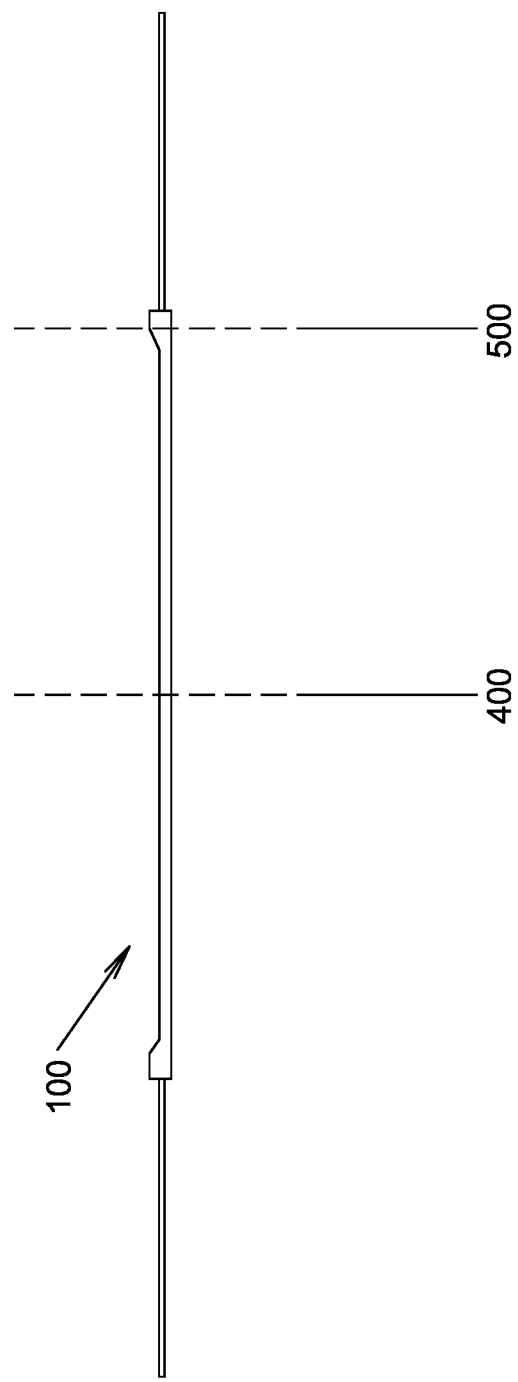
FIG. 6 depicts elevation of length and determination of cross section locations.
Figure 7:
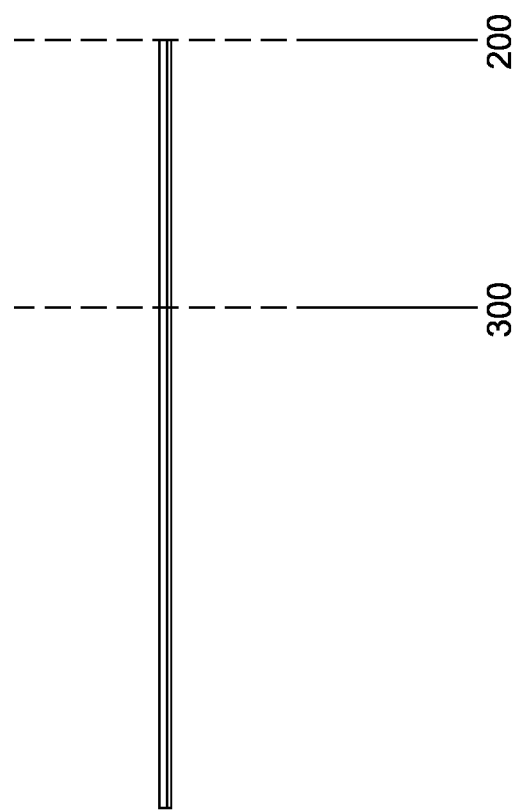
FIG. 7 depicts elevation of width and determination of cross section location.
Figure 8:
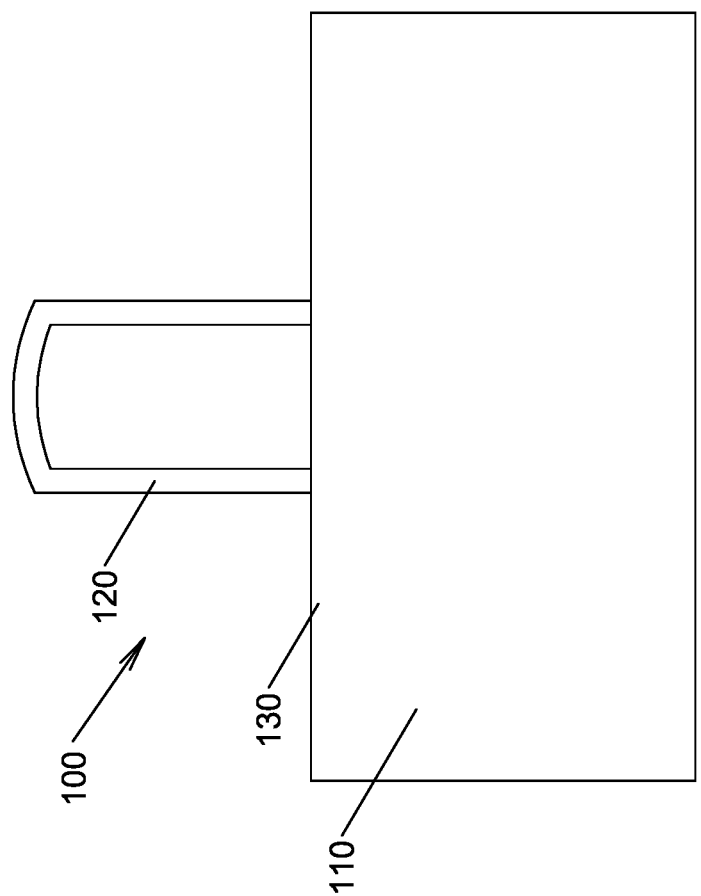
FIG. 8 depicts elevation of folded device in upright or carry position.

FIG. 1 shows the plan view of the unit 100 while fully opened in blanket or loading or unloading position. The fabric or material 110 may be constructed of water resistant or fabric of woven or non-woven type for use in outdoor setting.

In at least some of the embodiments, the main piece of fabric 110 is constructed of a suitable material for outdoor use and is strong enough and puncture resistant enough for materials and other matter such as, but not limited to, leaves, dirt, sand, moisture and debris to not interfere with use and in some cases be shaken or brushed off with ease.

Strap 120 in which may be used for carrying may be made of nylon, polyester, cotton, a composite, or may be made of any fabric or stitching that can hold the weight of items being carried.

Strap 120 and main canvas or fabric 110 may be machine washable, liquid and debris resistant. Fabric may or may not include pockets or embellishments; standard or screen printed or embroidered by manufacturer or aftermarket customization.

Pole or bar or stabilizer may create the stabilizer bar, herein referred to as stabilizer or stabilization bar 130. The stabilization bars can be made of nylon, PVC, plastic, composite, wood, metal, or any other material of stability.

The stabilization bars 130 keep the structure and stability of the unit and assist in holding elongated items such as chairs, beach umbrellas, sports equipment, and the like.

The stabilization bars 130 can be constructed of, but not limited to, nylon, plastic, PVC, wood, metal, composite material, or any strong material or composite material that is prone to withstand wear and tear or maintain structural integrity.

The main piece of fabric 110 may provide access to the stabilization bars to access accessories or for use in removing them to allow washing of the fabric 110 and straps 120.

Pockets or larger hems or seams 140 may be used to secure the stabilization bar. The stabilization bar 130 is used to provide the structural integrity of the embodiment.

Gription strips 150 or a fabric with gription or similar gripping solution can be applied onto or worked into the fabric or full design as to keep items from sliding to the side or sliding out easily. Side fabric, mesh, webbing, drawstring, or elastic may also assist.

The carrying strap may or may not be connected to or loop around 160 the internal stabilization bar 130, to ensure strength and stability. The carrying strap may loop around the entire structure or be secured to the fabric or the stabilization bar via sewing, stitching, grommets, clamps, clips, or different means to secure the straps 120.

Closure addition may be part of embodiment for use when embodiment is not used in mat position and for use in securing top while carrying if the user prefers. The design is not dependent on this feature and it may be eliminated without influence to the invention.

Accessories such as but not limited to, support bars to keep rain or shade canopy from having to be held, zippered or closable pouches, pockets 170, holders of specific items, and other accessories may or may not be designed to clip or attach to, or added to or through the stabilization bars 130 or the pockets wherein the stabilization bars reside 140.

Figure 9:
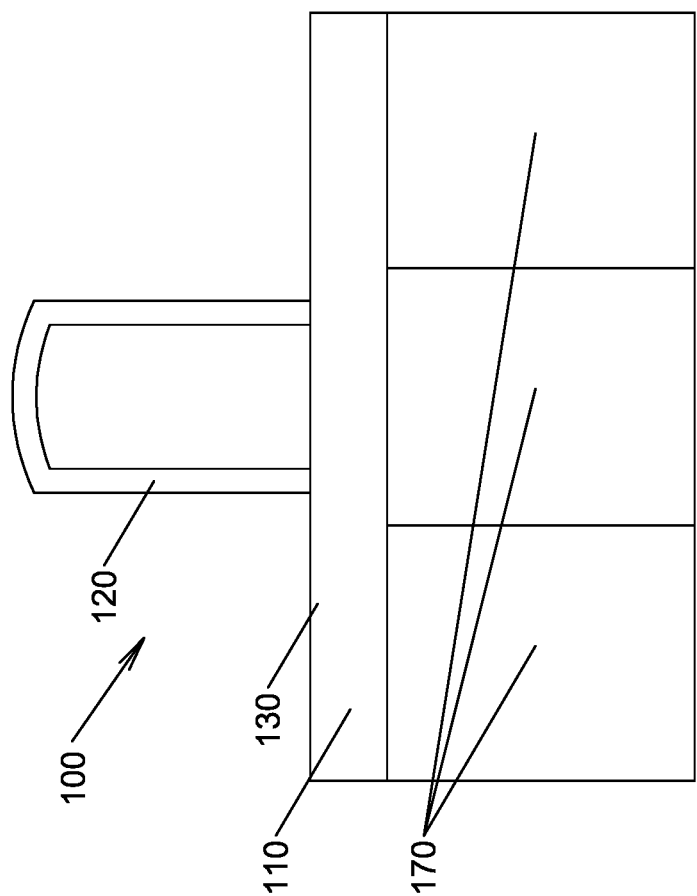
FIG. 9 is a sketch of the unit showing a possible use of the invention.
Figure 10:
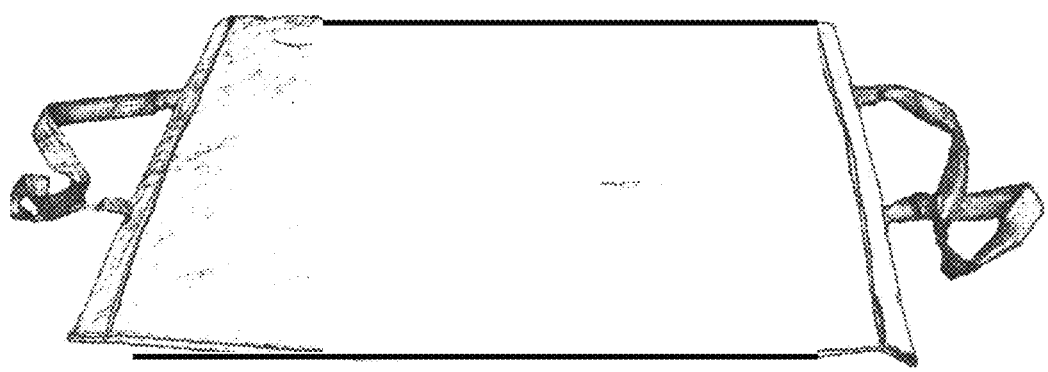
FIG. 10 is a sketch of the unit lying flat.
Figure 11:
FIG. 11 is a sketch of the unit in carrying position.

FIG. 9 is a drawing of convenience of setting up or taking down one's designated event spot. Set it down to easily unload, enjoy the blanket FIG. 10 during event, then load, lift or roll FIG. 9, and go FIG. 11.

multi-purpose carrier for collapsible chairs and other long items that can also serve as a picnic blanket or beach mat FIG. 10. The fabric may consist of water-repellant flexible material 110. The carrier is an indoor and outdoor portable and foldable mat, layer, blanket, shade umbrella, rain umbrella, or cover for sitting or keeping clean space at sporting events, picnics, beach, parades, practices, concerts, or other recreational activities.

The invention claimed is:

1. A multipurpose carrier comprising:
 a sheet of material, the sheet being water resistant, the sheet having two lateral edges, two longitudinal edges, an inside surface and an outside surface;
 a flexible carry strap attached to each longitudinal edge of the sheet of material, each end of the flexible carry straps having a loop;
 a pocket on each longitudinal edge of the sheet of material formed by the sheet of material being folded over on itself and stitched;
 a rigid stabilization bar positioned within each pocket and extending along each longitudinal edge of the sheet of material;
 two apertures in each pocket and centered on each longitudinal edge, wherein the ends of the carry straps extend through the apertures and the loops are received on the rigid stabilization bar;
 a plurality of grip strips on the sheet of material and extending along each lateral edge, each set of grip strips forming a line along the respective lateral edge;
 a plurality of compartments included on the outside surface of the sheet of material, the compartments aligned along the longitudinal edge of the sheet of material;
 wherein the pockets and the carry straps are configured to allow the rigid stabilization bars to be removed from the pockets and from the carry straps to allow for cleaning the sheet of material and the carry straps;
 wherein the multipurpose carrier has a carrier configuration, in which the sheet of material is folded in half at a lateral centerline and suspended above a support surface by the carry straps to carry items within a cavity formed by the inside surface of the sheet of material,
 wherein the multipurpose carrier has a mat configuration, in which the sheet of material is positioned flat on a support surface, with the outside surface of the sheet of material facing the support surface; and
 wherein the multipurpose carrier has a canopy configuration, in which the sheet of material is positioned at least partially above the support surface, the canopy configuration shielding against rain and sun.

2. The multipurpose carrier of claim 1 wherein the loops are grommets.

3. The multipurpose carrier of claim 1 wherein the flexible carry strap comprises nylon, polyester, cotton, a composite or fabric.

4. The multipurpose carrier of claim 1 wherein the rigid stabilization bar comprises PVC, plastic, composite, wood or metal.

5. The multipurpose carrier of claim 1 further including a closure for use in securing the longitudinal edges of the sheet of material together when the multipurpose carrier is in the carrier configuration.

6. The multipurpose carrier of claim 1 further including support bars to support the sheet of material when the multipurpose carrier is in the canopy configuration.

* * * * *